Aug. 1, 1967  J. F. RODMAN  3,333,678
COVER PLATE FOR CONVEYOR BELT
Filed March 16, 1966  4 Sheets-Sheet 1
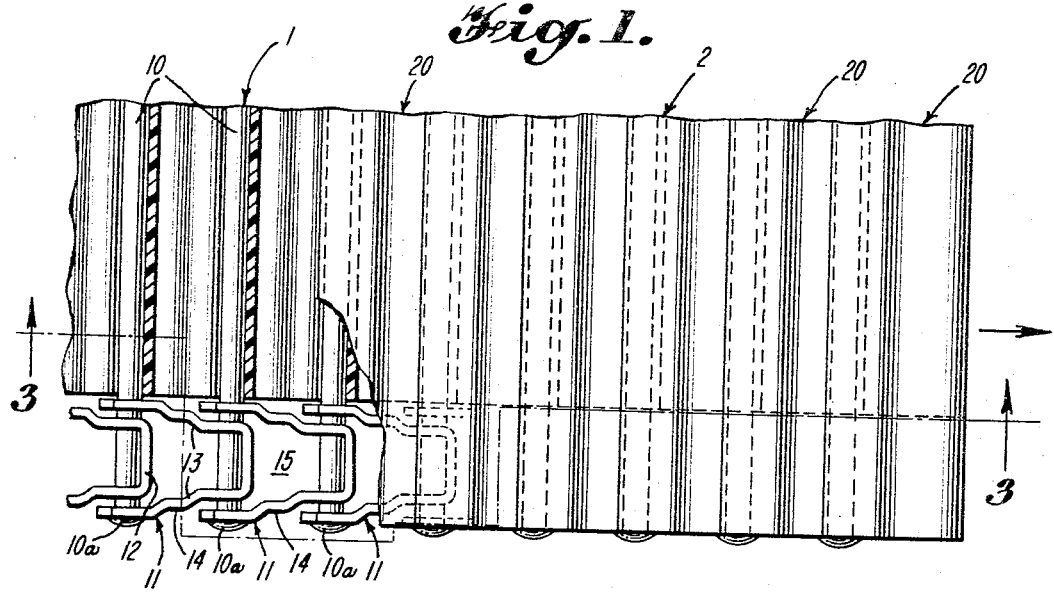
Fig. 1.
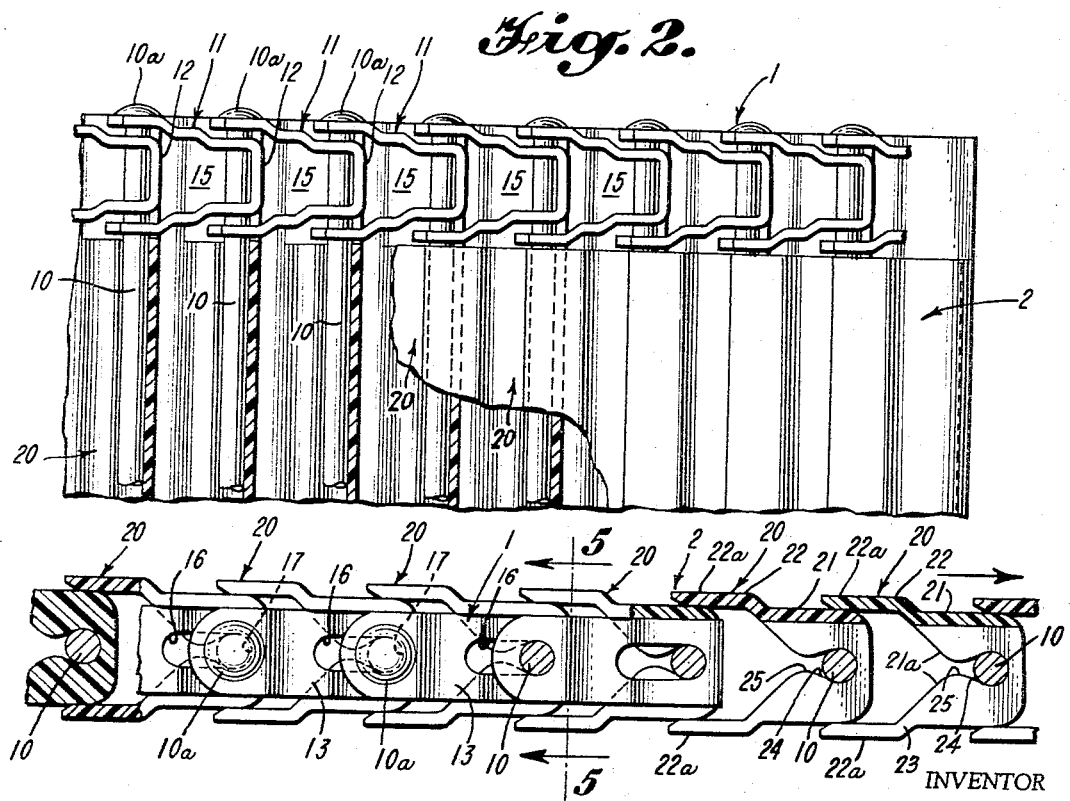
Fig. 2.
Fig. 3.
INVENTOR
JOHN FRANKLIN RODMAN
BY
Irons, Birch, Swinler & McKie
ATTORNEYS

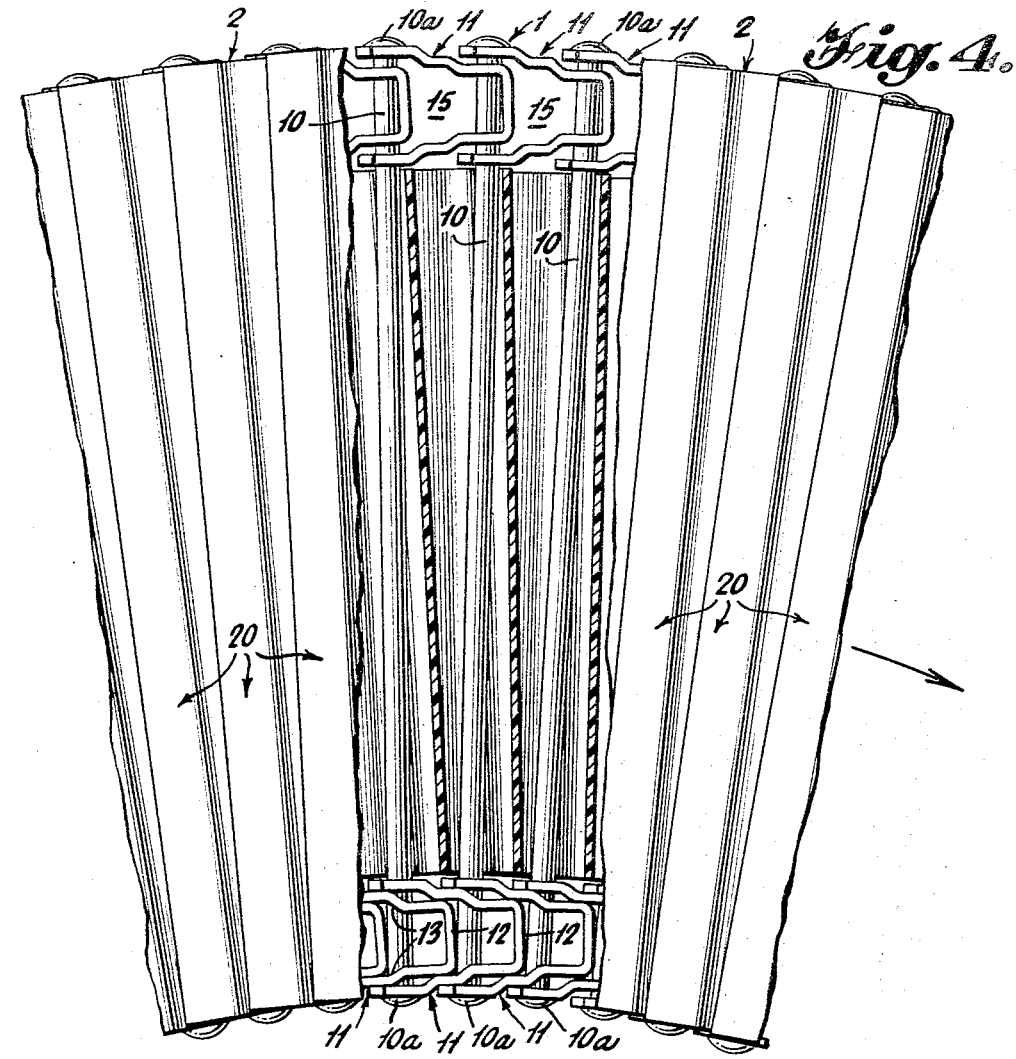
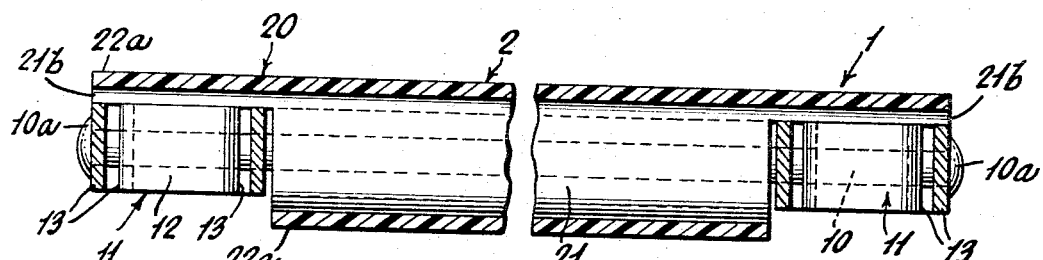

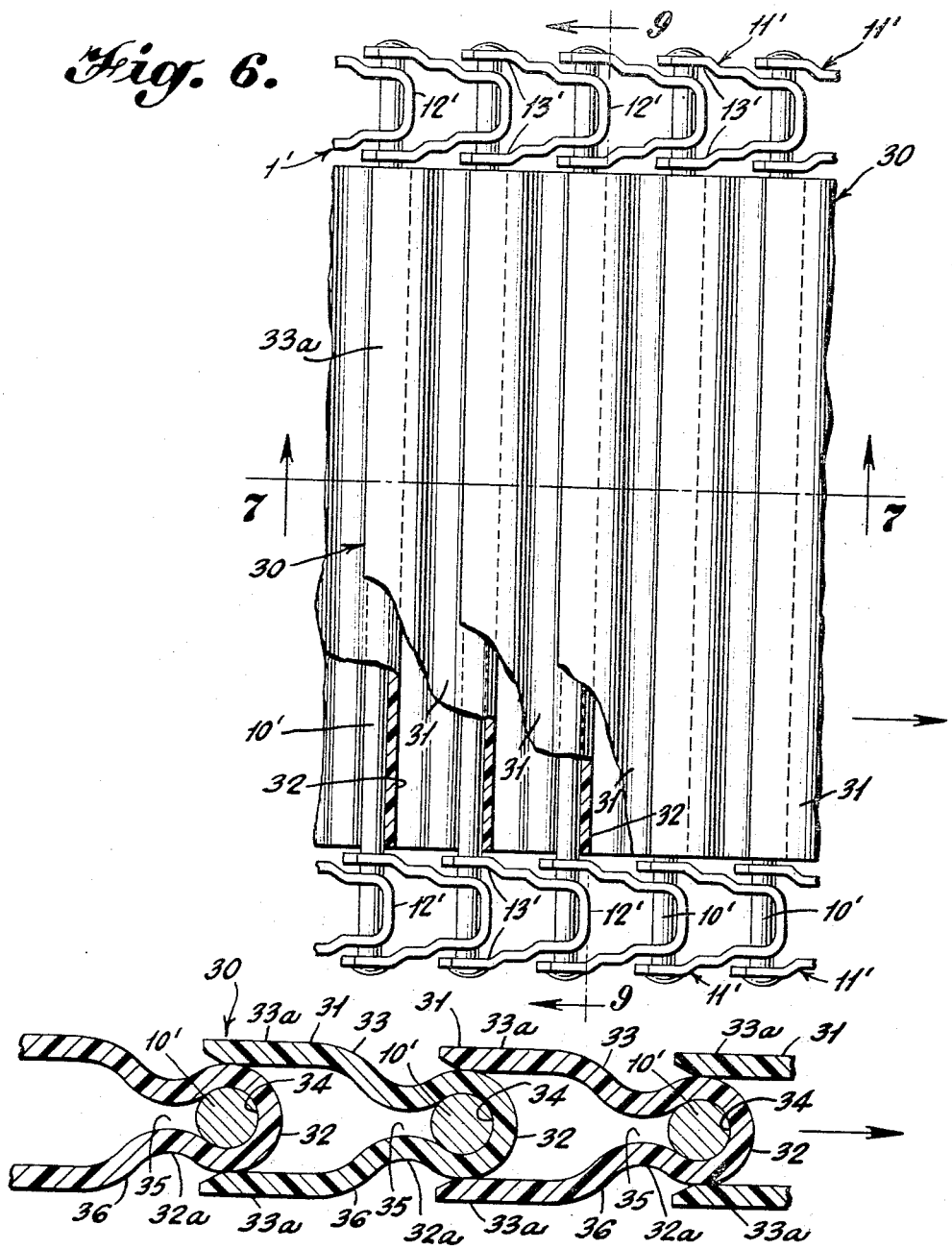

Aug. 1, 1967  J. F. RODMAN  3,333,678
COVER PLATE FOR CONVEYOR BELT
Filed March 16, 1966  4 Sheets-Sheet 4

INVENTOR
JOHN FRANKLIN RODMAN

BY Irons, Birch, Swindler & McKie
ATTORNEYS 3,333,678
COVER PLATE FOR CONVEYOR BELT
John Franklin Rodman, Winchester, Va., assignor to Ashworth Bros., Inc., Fall River, Mass., a corporation of Massachusetts
Filed Mar. 16, 1966, Ser. No. 534,817
11 Claims. (Cl. 198—181)

ABSTRACT OF THE DISCLOSURE

This invention relates to conveyor belts, particularly a conveyor belt providing substantially continuous, opposed supporting surfaces. The conveyor belt includes an open framework and separate, transversely extending elements, each pivotally connected to said framework and having opposed sides each defining a supporting surface. These individual elements are generally U-shaped having a leading portion and a trailing portion, the trailing portion includes a pair of generally parallel spaced legs at opposite surfaces of said belt. The leading portion of each element is disposed between the legs of the next adjacent element in overlapping relation to thereby provide opposed continuous supporting surfaces.

---

This invention relates to a cover plate for a conveyor belt, and, more particularly, to a cover plate providing a substantially continuous supporting surface on an open-frame conveyor belt.

Conveyor belt systems are widely used in a great variety of industrial fields. In many installations the conveyor belt has a conveying surface of open-frame construction formed by spaced rods in generally parallel relationship and extending transversely to the direction of motion of the belt. Typically, the rods are interconnected by two parallel rows of links at the extreme edges of the belt and thus at the opposite ends of the rods.

An example of a conveyor belt having a supporting surface comprising a plurality of transverse rods is shown in the U.S. Letters Patent 3,225,898 to Gerald C. Roinestad, entitled, "Collapsible Conveyor Belt." The conveyor belt of the Roinestad Patent 3,225,898 includes a link construction which enables the conveyor belt to travel through an edgewise arcuate path in the plane of the belt as well as an arcuate path about an axis parallel to the plane of the belt.

It frequently is desirable to provide a substantially continuous supporting surface on one or both sides of a conveyor belt having such an open frame construction. Such a continuous surface may be provided by cover plates which enable the belt to transfer materials of such a size or configuration that they would pass through or become lodged within the spaces between the transverse rods of the conveyor belt. In addition, the cover plates may serve a protective function. For example, soft or fragile articles which might be damaged if they were to be placed directly on the metal transverse rods may be protected by a cover plate of a suitable, soft material, such as rubber or any of various plastics. In the alternative, the cover plate may protect the transverse rods from excessive wear, as by abrasion.

It is desirable that the cover plate be easily installed on the assembled belt. The initial installation of the conveyor belt often is much easier if the cover plate is not present. In addition, since the cover plate typically is of a softer or less durable material than that of the belt, which typically is of steel or other suitable metal, it is to be expected that the cover plate will become worn and require replacement prior to the conveyor belt and other elements of the conveyor system. Thus, it is desirable that the cover plate be readily removable to allow replacement with a new cover plate without requiring complete disassembly of the conveyor belt system.

A difficult problem is presented in providing a cover plate for a spaced, transverse rod conveyor belt of the type of the above-identified Roinestad patent; the belt is collapsible to permit it to travel through an arcuate path in the plane of the belt. In executing the arcuate path, the belt of the Roinestad patent collapses on one side relative to the other side, requiring a corresponding collapse of the cover plate. The cover plate, however, must continue to provide a substantially continuous supporting surface if the intended purpose of the cover plate is to be achieved.

Frequently, it is necessary or desirable that a conveyor belt be capable of transporting articles on each of its opposite surfaces. For example, the conveyor belt of the Roinestad patent may travel through a turning path which inverts the conveyor belt after each run. The upper surface of the belt, as it enters the turning path, becomes the lower surface of the belt as it exits from the turning path. As a result, during successive, complete runs of the belt, the opposite surfaces are presented alternately along a given path, thereby equalizing wear on the opposite surfaces on the belt.

In any system in which both surfaces of a conveyor belt are employed as supporting surfaces, a cover plate provided for the belt must provide a substantially continuous supporting surface of substantially an identical nature on both of the opposite surfaces of the belt.

Cover plates which have been provided heretofore for conveyor belts have not been entirely satisfactory for a number of reasons. Frequently, such prior art cover plates must be installed on the belt prior to assembly of the belt in a given system, or are difficult to install or replace on a belt previously assembled in a system. Others of the prior art cover plates do not provide a sufficiently continuous supporting surface and still others do not provide a supporting surface on both of the opposite sides of the belt. Further, most of the prior art cover plates are not capable of use with a conveyor belt of the type found in the Roinestad patent since they are not capable of collapsing with one edge of the belt while the belt travels through an arcuate path in the plane of the belt.

These and other deficiencies of prior art cover plates are overcome by the cover plate of the invention.

It is therefore an object of this invention to provide an improved cover plate presenting a substantially continuous supporting surface for a conveyor belt.

Still another object of this invention is to provide a cover plate for a spaced rod conveyor belt which provides a substantially continuous supporting surface across the entire width of the conveyor belt.

A further object of this invention is to provide a cover plate for a conveyor belt which presents substantially identical continuous supporting surfaces on both of the opposite surfaces of the conveyor belt.

Still a further object of this invention is to provide a cover plate for a spaced, transverse rod conveyor belt which is low in cost and which is easy to install on the conveyor belt.

In accordance with a preferred embodiment of the invention, the cover plate comprises a plurality of generally U-shaped elements of resilient material including a leading portion and a trailing portion. The leading portion includes a recess and the trailing portion comprises a pair of spaced, generally legs. The recess communicates with the space between the legs through a slot. The cover plate is installed by mounting one of the elements on each of the transverse rods of the belt. The rod is received between the spaced, parallel legs and is forced through the slot into the recess of the leading portion of the element. The recess provides a partial bearing within which the rod is resiliently locked in position. No separate attachment devices (e.g., clamps, screws, or the like) nor any special equipment therefore is required to install the cover plate. The U-shaped elements are mounted on corresponding ones of said rods, the legs of the trailing portion of each successive element overlapping and closely engaging the opposite surfaces of the leading portion of the next succeeding element. Each element, therefore, is supported at its leading portion by its associated transverse rod resiliently locked therewithin and at its trailing portion by the leading portion of the next succeeding element. The leading portion and the space within the trailing portion of each element are of substantially identical configurations, such that the former maintains the legs of the latter in proper, spaced relationship. As a result, a cover plate comprising a plurality of these cooperating elements provides a substantially continuous surface on one or both of the opposite sides of the belt. The leading portion of each element is rotatably and slidably received within the trailing portion of the next preceding element, so that the cover plate does not hinder the travel of the belt through an arcuate path in the plane of the belt or through an arcuate path about an axis parallel to the plane of the belt.

For a better understanding of the invention, reference may be had to the following detailed description and drawings, in which:

FIG. 1 is a plan view of a portion of a conveyor belt incorporating a first embodiment of the cover plate of the invention, a portion of the cover plate being broken away to disclose the underlying belt structure;

FIG. 2 is a bottom plan view of the belt of FIG. 1;

FIG. 3 is a side elevation of the belt and cover plate of FIG. 1, taken along the line 3—3 of FIG. 2;

FIG. 4 is a top plan view of the belt and cover plate of FIG. 1 showing the conveyor belt of FIG. 1 partially collapsed in its movement through an arcuate path in the plane of the belt;

FIG. 5 is a sectional view of the belt taken along the line 5—5 of FIG. 3;

FIG. 6 is a plan view of a conveyor belt including a cover plate in accordance with a second embodiment of the invention;

FIG. 7 is a sectional view taken along the line 7—7 of FIG. 6;

FIGURES 1 to 5

Figure 8:
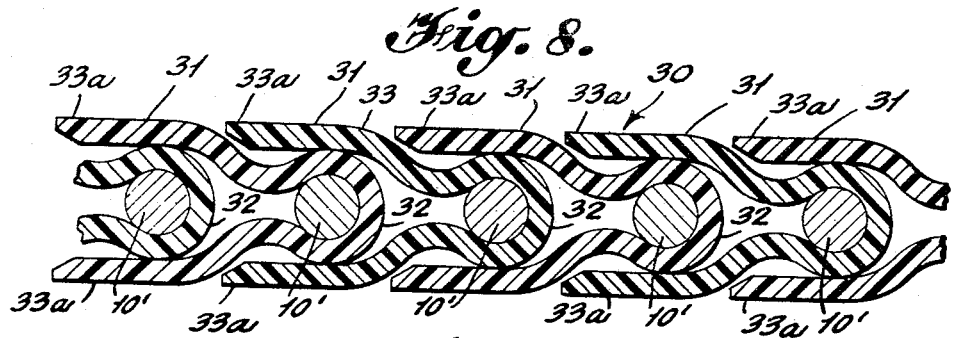
FIG. 8 is a sectional view taken along the line 7—7 but showing the belt and cover plate in a collapsed condition.

In FIGURES 1 to 5 there is shown a conveyor belt 1 of the spaced, transverse rod construction to which is secured a cover plate 2 in accordance with a first embodiment of the invention. For a more complete description of the conveyor belt 1, reference may be had to the above-described U.S. Letters Patent 3,225,898 to Roinestad.

The conveyor belt 1 includes a plurality of transverse rods 10 shown in FIGUURES 1 to 3 in their normally parallel, equally longitudinally spaced relationship extending transversely to the straight longitudinal direction of motion of the conveyor belt 1, as indicated by the arrow in FIGURE 1. Preferably, the conveyor belt 1 is moved in the direction, as indicated by the arrow. For convenience of description, the orientation of the conveyor belt 1 as shown in FIGURE 1 will be defined as lying in a horizontal plane and moving in a straight line path therein, although it will be appreciated that the plane of the belt may be inclined at an angle relatively to a normally horizontal plane.

The rods 10 are slidably and pivotally interconnected at each of their ends by a plurality of generally U-shaped, stepped connecting links 11. Although in FIGURES 1 and 2 only a portion of the width of the belt 1 and thus only one end of the rod 10 is shown, the connecting links 11 are to be understood to be arranged in a pair of spaced rows at opposite ends of the rods 10.

Each of the links 11 includes a straight base portion 12 having a pair of legs 13 rigidly connected to its outer ends. Each of the legs 13 has a plurality of stepped portions 14 to provide a spacing 15 within each of the links 11 which is relatively narrow at the base portion 12 and which becomes progressively wider at the opposite end thereof. The stepped portions 14 of each link are constructed substantially parallel to each other and to the direction of movement of the belt, as shown by the arrow in FIG. 1. As best seen in FIG. 3, each of the links 11 includes, in the legs 13 thereof, a pair of aligned, elongated rod openings 16 adjacent the base 12 and a pair of generally circular, aligned rod openings 17 near their outer ends.

As shown in FIGURE 1, the connecting links 11 are arranged in partially nested or telescoped relationship with the inner, reduced width end 12 of each link 11 received between the wider end of the legs 13 of the respectively next succeeding link 11. Thus the outer, more widely spaced ends of the legs 13 of each connecting link 11 overlap the base or inner end 12 of the adjoining link so that the rod openings 17 are aligned with the rod openings 16 of the preceding link. A rod 10 is received, at each of its opposite ends, through the aligned openings 16 and 17 of two adjoining links 11 and secured against withdrawal, such as by welding an enlargement over the end of the rod, as indicated at 10a. Preferably, the enlarged end 10a of each rod 10 is secured to the underlying leg 13 of its associated link 11 at each end of the rod 10 to maintain the links 11 in fixed, spaced relationship. The rods 10 remain free to slide and to rotate within the slot 16 of the next preceding link 11. The links 11 therefore serve to pivotally and slidably interconnect the rods 10. The openings 15 within each link 11 provide a space between each rode 10 and the base 12 of an adjoining link 11 for receiving sprockets to permit the belt 1 to be driven.

The interconnecting link construction of the belt 1 permits the belt to be driven through an arcuate path in the plane of the belt, as shown in FIG. 4. The arcuate path may also be defined as arcuate about an axis perpendicular to the plane of the belt 1, and thus a vertical axis if the belt 1 is in a horizontal plane. The elongated slots 16 permit the links 11 to nest more closely, thereby enabling one edge of the belt 1 to collapse. The rods 10 move from their normally parallel, evenly spaced relationship to an angular or diverging relationship when one edge of the belt 1 is collapsed, as shown in FIG. 4.

The cover plates 2 of the invention comprise a plurality of elements 20 which are of generally U-shaped configuration and are formed of a resilient material. Preferably, the material is flexible such as rubber or any of various synthetic plastics or a combination of these materials. One particularly suitable material would be polypropylene. If desired, metal or a combination of metal with rubber or plastic may be used.

With reference to FIG. 3, each element 20 includes a leading portion 21 and a trailing portion 22, the latter comprising a pair of spaced, generally parallel legs 22a Each of the legs 22a of the trailing portion 22 is stepped or displaced outwardly from the opposite sides of the leading portion 21 by an amount approximately equal to the thickness of the legs 22a and is integrally joined to the leading portion 21 by a diverging, intermediate portion 23. The leading portion 21 includes inwardly projecting interior walls 21a which converge to define a recess 24 and a restricted entrance 25. The height of the entrance 25 is less than the thickness of the rod 10. The recess 24 communicates through the entrance 25 with the space between the legs 22a.

The terms "leading portion" and "trailing portion" are employed as a convenience in describing the cover plate relative to the usual direction of travel of the belt. They are not to be construed, however, as limiting the orientation of the cover plates with the "leading portion" pointed in the direction of belt travel. If desired, the cover plates may be mounted with their "leading portions" pointed opposite to the direction of belt travel.

The elements 20 of the cover plate 2 are installed on the belt 1 by mounting each one of the elements 20 on a corresponding rod 10. A cover plate element 20 is provided for each rod 10 throughout the length of the belt 1. Each rod 10 is inserted into the slot, between the legs 22a of the trailing portion 22 of its associated element 20, and forced through the restricted entrance 25, temporarily deforming the element 20. The rod 10 is then received within the recess 24, and the element 20 returns to its normal configuration. The recess 24 provides a partial bearing for the rod 10, within which the latter is resiliently locked. The cover plate elements 20, however, preferably remain free to rotate slightly about the rod 10.

An element 20 is mounted onto an associated one of each of the plurality of rods 10 in sequence from left to right in the drawing of FIG. 1. The spacing between the legs 22a of the trailing portion 22 is approximately equal to the thickness of the leading portion 21. In addition, the total length of each element 20, from the front of its leading portion 21 to the end of its trailing portion 22, is such, relative to the maximum spacing between the rods 10, that the legs of the trailing portion 22 of a given element 20 overlap the leading portion 21 of the next succeeding element 20. Thus, each element 20 is supported at its leading portion 21 by the transverse rod 10 resiliently locked therewithin and at its trailing portion 22 by the overlapping engagement of its legs 22a with the leading portion 21 of the next succeeding element 20, and thus also with the next succeeding transverse rod 10.

The space between the legs 22a, the diverging intermediate portion 23, and the converging interior walls 21a is sufficient in size and of a mating configuration for slidably receiving the leading portion 21 of the next succeeding element 20. Thus, the elements telescope within one another when the belt 1 is collapsed along either or both edges. Preferably, the inner surfaces adjacent the ends of the legs 22a are cut at an angle to facilitate the nesting relationship and to avoid undesirable abrasion between successive elements 20 in assuming the collapsed condition.

The cover plate 2 of FIGS. 1 to 5 is intended for use with a conveying system in which only one surface of the belt performs a conveying function. Such a belt is not required to be reversible, and may always be driven by sprockets engaging the belt on a single surface—normally the inner surface thereof. It therefore is possible to make the width of the cover plate on one surface of the belt equal to the full width of the belt, as measured between the outer edges of the links 11. Conversely, on the opposite surface of the belt, the links 11 must remain exposed for engagement by driving sprockets.

Thus, on the top, or conveying surface of the belt 1 as shown in FIG. 1 the cover plate 2 extends across the full width of the belt 1, between the outer edges of the links 11. The cover plate thereby conceals the links 11 and renders the full width of the belt 1 available for conveying purposes. Conversely, on the bottom surfaces of the belt 1 as shown in FIG. 2, the cover plate 2 is of a width no greater than the distance between the inner edges of the links 11, leaving the latter exposed for engagement by sprockets for driving the belt 1.

In FIG. 5 is shown the relationship of successive elements 20 (each shown in partial section) for achieving the foregoing characteristics of the cover plate 2. There is shown the leading portion 21 of a given element 20. The leading portion 21 is of greater thickness or height than that of the links 11, and extends above the links 11 at least on the upper surface of the belt 1. Flanges 21b extend from the opposite ends of the leading portion 21 in coplanar relationship with the upper surface thereof, overlying the corresponding rows of links 11. The cross-hatched horizontal surfaces represent a cross-section through the legs 22a of the trailing portion 22 of the next preceding element 20. The upper leg 22a extends across the full width of the belt 1, overlapping the leading portion 21 and concealing the underlining links 11 on the opposite edges of the belt 1. As a result, the leading portion 21 and trailing portion 22 cooperate to provide a substantially continuous supporting surface across the full width of the upper surface of the belt 1.

The remainder of the leading portion 21 below the upper surface of the belt, and the lower leg 22a of the trailing portion 22 are of a width approximately equal to the distance between the inner edges of the links 11, and thus of the same width as the lower leg 22a. It will be appreciated that the leading portion 21 of element 20 serves to maintain the element 20 in centered relationship on the belt 1. If desired, the leading portion 21 may be reduced in width if appropirate spacers are provided to fulfill the centering function. In any event, however, the leading portion 21 should provide a continuous surface extending across the full width of the top surface of the belt 1.

As shown in FIG. 4, the nesting or telescoping relationship of the elements 20 renders them capable of assuming a collapsed condition at either edge of the belt 1, in alignment with their respectively associated rods 10, as the belt 1 moves through an arcuate path in the plane of the belt. The ends of the legs 22a of the trailing portion 22 of each element 20 closely approach the juncture of the leading portion 21 and the trailing portion 22 of the next successive element 20 in the collapsed edge of the belt. Conversely, at the uncollapsed, or outer edge of the belt (which passes through an arcuate path of greater radius), the rods 10 and the elements 20 maintain approximately the normal separation. As a result, the elements 20 assume a diverging, or angular relationship, essentially as that defined by the rods 10. Upon completion of the travel through the arcuate path, the rods 10 and the elements 20 return to their normal, generally parallel relationship.

FIGURES 6 TO 10

In FIGS. 6 to 10 there is shown a cover plate 30 in accordance with a second embodiment of the invention installed on a conveyor belt 1' which is identical to the conveyor belt 1 of FIGS. 1 to 5, identical elements being indicated by identical, but primed numerals in FIGS. 6 to 10.

The cover plates 30 comprise a plurality of generally U-shaped elements 31 formed by a flexibly rigid material and including a leading portion 32 of generally arcuate configuration and a trailing portion 33 of parallel, spaced legs 33a. The leading portion 32 includes a necked-down concave portion 32a on its opposite sides defining a recess 34 and a restricted entrance 35. The leading portion 32 is integrally joined to the legs 33a of the trailing portion 33 by diverging, intermediate portions 36. The recess 34 communicates through the entrance 35 with the space between the legs 33a, to define a slot.

The elements 31 are secured to the transverse rods 10' of the belt 1' in substantially the identical manner as hereinbefore described with reference to the elements 20 of FIGS. 1 to 5. A rod 10' is inserted into the slot, between the legs 33a, and forced through the restricted opening 35, temporarily deforming the element 31. The rod 10' is then received within the recess 34, and the element 31 returns to its normal configuration. The recess 34 provides a partial bearing for the rod 10', within which the latter is resiliently locked. The element 31, however, preferably remains free to rotate about the rod 10'. The elements 31 are snapped into position in this manner in succession, from left to right in the drawings. The spacing between the legs 33a is approximately equal to the maximum thickness of the arcuate leading portion 32. In addition, the length of each element 31 is such, with relation to the separation of the rods 10' that the legs 33a thereof are received over and closely engage the leading portion 32 of the next succeeding element 31. Thus, each element 31 is supported at its leading portion 32 by the transverse rod 10' resiliently locked therewithin, and at its trailing portion 33 by engagement with the leading portion 32 of the next succeeding element 31.

Each element 31 is slidably and pivotally interconnected with the adjoining elements 31. Thus, as shown in FIG. 8, the elements 31 may be telescoped inot a more closely nested or collapsed relationship, such as is required when the conveyor belt passes through an arcuate path in the plane of the belt, in the manner shown in FIG. 4 with regard to the belt 1 and cover plate 2. Preferably, the inner surfaces adjacent the ends of the legs 33a and 33b are cut at an angle to facilitate the nesting relationship and to avoid undesirable abrasion between successive elements 31 in assuming the collapsed condition.

Figure 10:
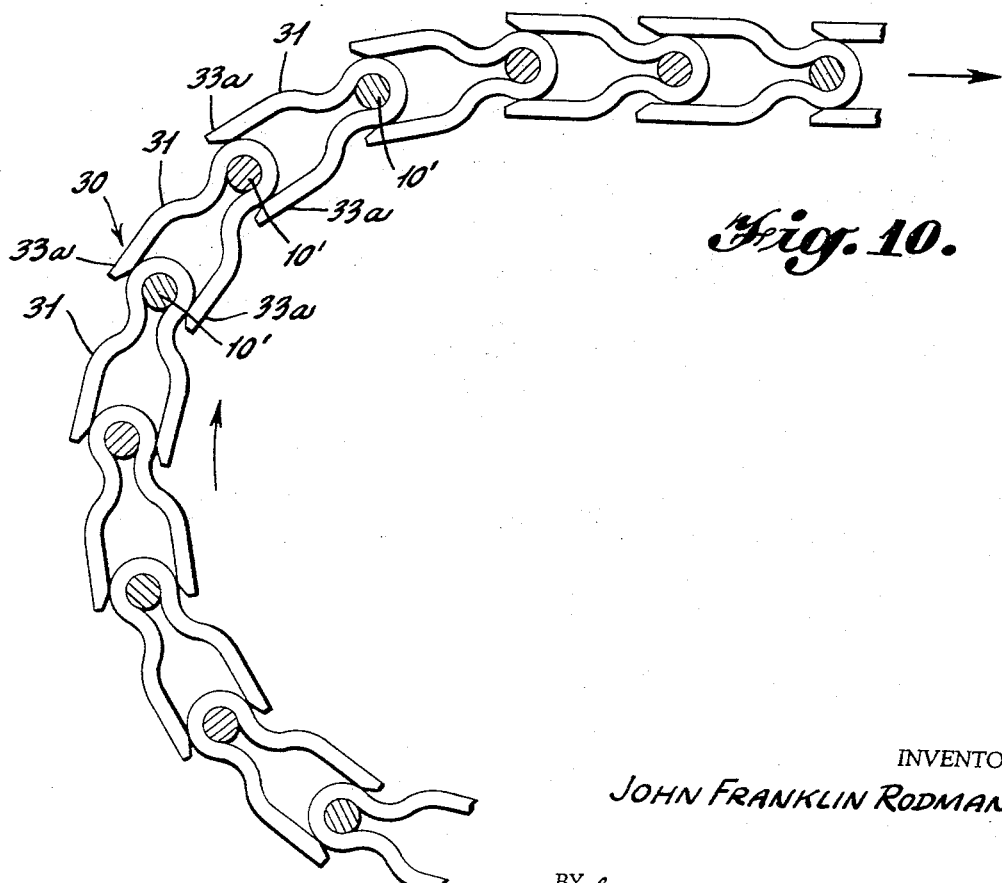
FIG. 10 is a sectional view similar to that in FIG. 7 and showing the configuration of the cover plate during motion of the belt through an arcuate path about an axis parallel to the plane of the belt.

The pivotal relationship between successive elements 31 is indicated in FIG. 10. FIG. 10 is a longitudinal cross-section taken through a line such as 7—7 in FIG. 6, wherein the conveyor belt is being driven through an arcuate path about an axis parallel to the rods 10'. In passing through the arcuate path, it will be appreciated that each element 31 is free to rotate about its respectively associated transverse rod 10' and that the legs 33a of the trailing portion 33 are free to rotate relatively to the leading portion 32 of the next succeeding element 31. The concave recess 32a in each element 31 facilitates the pivotal, relative motion of adjoining elements 31 as the conveyor belt moves through the arcuate path. With reference to the inner surface of the belt, i.e., the surface of the belt at the shorter radius of the arcuate path, the leg of the trailing portion 33 is free to project inwardly into the concave recess 32a and approach the juncture of the leading portion 32 and the trailing portion 33 of the succeeding element 31 without any danger of binding which would hinder the pivoting action. Upon completion of travel through the arcuate path, the elements 31 return to their normally aligned configuration in a flat horizontal plane.

Figure 9:
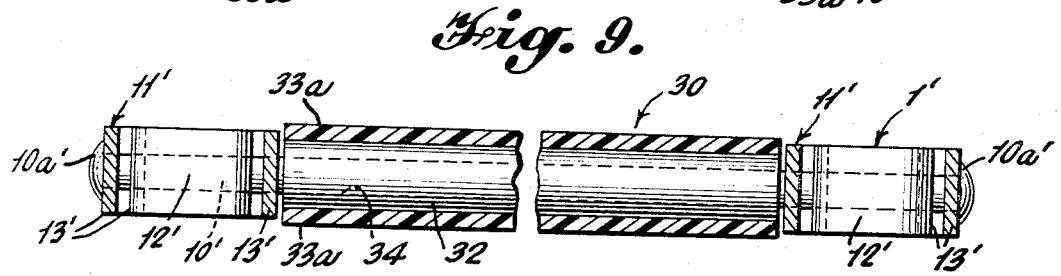
FIG. 9 is a sectional view taken along the line 9—9 of FIG. 6.

As clearly shown in FIG. 9, the legs 33a of the trailing portion 33 are of equal width on both of the opposite surfaces of the belt 1', which width is approximately equal to the distance between the inner edges of the links 11'. Thus, both surfaces of the links 11' are exposed and either or both surfaces may receive sprockets for driving the belt. It should be noted that, since the cover plate 30 does not cover the links 11 on etiher side, its thickness is a function only of the strength requirements with regard to the material from which the elements 31 are formed. By comparison to FIG. 5, it will be seen that the elements 31 may be of a reduced thickness relative to the elements 20 for a given belt 1 (or 1').

As hereinbefore described, the belt 1' is capable of travel through an arcuate path in the plane of the belt and an arcuate path having an axis parallel to the plane of the belt, and thus the opposite surfaces of the belt may be alternately exposed along a given run for successive, complete runs of the belt 1'. Thus, both surfaces of the belt are exposed for use, and the wear on the opposite surfaces of the belt may be equalized. As a result better utilization of the cover plate material is achieved, resulting in greater efficiency and longer life in operation of the conveyor belt.

If desired, the cover plate 2 may have a necked-down outer surface like the portion 32a of cover plate 30. Similarly, the cover plate 30 may have an outer surface like that of cover plate 2. The cross-sectional configuration, like that of cover plate 30, since it has a uniform wall thickness, is preferred for easier fabrication.

Other advantages of the cover plates of the invention will be readily apparent to those skilled in the art. The elements of the cover plates are very easy and inexpensive to manufacture, and may be made of any desired strength and size. The elements are quickly and easily installed without the use of special tools or equipment, and without the use of any additional hardware, such as clips and the like. Further, one or more of the elements may be quickly replaced, as where one becomes damaged, or where the entire cover plate is worn to an extent that it requires replacement.

It also will be understood that the cover plate of this invention may be employed with various belt structures which may be designed to travel straight or curved paths or both. The invention is not restricted to the specific belt structure shown in the drawings.

It therefore is intended by the appended claims to cover all such modifications and adaptations of the cover plate of the invention as fall within the spirit and scope of the appended claims.

What is claimed is:

1. A cover plate for use with a conveyor belt having a support rod extending transversely of the path of movement of said belt, said cover plate comprising:
    a generally U-shaped element including a leading portion and a trailing portion, said leading portion having a first dimension normal to the plane of the conveyor belt;
    means associated with said leading portion for pivotally connecting said element to the rod for moving said element with said belt; and
    said trailing portion including a pair of generally parallel, freely extending spaced legs disposed on opposite surfaces of said belt and extending rearwardly of said leading portion, said legs being spaced apart a distance greater than the first dimension of said element defining therebetween a groove extending generally parallel to said rod, said groove having open ends.

2. A cover plate as recited in claim 1 wherein said connecting means on said leading portion of said element includes a recess for receiving said rod to connect said element to said rod.

3. A cover plate for use with a conveyor belt having a support rod extending transversely of the path of movement of said belt, said cover plate comprising:
    a generally U-shaped element including a leading portion and a trailing portion;
    said element defines a rearwardly extending slot therewithin, including a recess within said leading portion and a space between said legs; and
    said element is connectable to said rod by receiving said rod through said slot and into engagement within said recess;
    said trailing portion including a pair of generally parallel spaced legs disposed on opposite surfaces of said belt.

4. A cover plate as recited in claim 3 wherein:
    said element is formed of flexible resilient material;
    said leading portion includes inwardly converging surfaces defining a restricted entrance to said recess, said entrance communicating between said recess and the space between said legs;
    said restricted entrance being of smaller height than the thickness of said rod and said element being resiliently deformable for receiving said rod through said restricted entrance and into said recess; and
    said inwardly converging surfaces resiliently lock said element on said rod when said rod is received within said recess.

5. A cover plate as recited in claim 4 wherein:

said rod is of substantially circular cross-section;

said leading portion, including said recess, provides a partial bearing for said rod and resiliently locks said element to said rod when said rod is received within said recess; and said element is rotatable about said rod.

6. In a conveyor belt the combination which comprises:

a plurality of rods extending transversely of the path of movement of the belt and spaced from each other in normally parallel relationship;

means pivotally interconnecting the ends of said rods;

a plurality of cover plates each comprising a generally U-shaped element, each of said elements including a leading portion and a trailing portion;

said elements being connected at said leading portions to corresponding ones of said rods;

each of said trailing portions including a pair of generally parallel spaced legs disposed on opposite sides of the leading portion of the adjoining element in overlapping relationship;

each of said elements being supported at its leading portion by the corresponding rod to which it is connected and at its trailing portion by the leading portion of the adjoining element; and said elements cooperating to provide a substantially continuous supporting surface on both sides of said belt.

7. A conveyor belt as recited in claim 6 wherein said cover plates extend on one surface of the belt laterally over said rod interconnecting means and on the other surface of the belt leave said rod interconnecting means exposed.

8. A conveyor belt as recited in claim 6 wherein said cover plates leave said rod interconnecting means exposed on both surfaces of the belt.

9. A conveyor belt as recited in claim 6 wherein:

each of said elements defines a recess within said leading portion communicating with said space between said legs; and said elements are connected to said rods by receiving said rods through said spaces into said recesses.

10. A conveyor belt as recited in claim 9 wherein:

said cover plates are formed of flexible resilient material;

said leading portion of each of said element includes inwardly converging surfaces defining a restricted entrance to said recess, said entrance communicating between said recess and said space between said legs; and said restricted entrance being of smaller height than the thickness of said rod and said element being resiliently deformable for receiving said rod through said restricted entrance so that said rod is resiliently locked in said recess by said inwardly converging surfaces.

11. A conveyor belt as recited in claim 6 wherein:

said rod interconnecting means collapsibly connect the ends of said rods to permit either edge of said belt to collapse longitudinally;

said leading portion of each element is slidingly engaged within the trailing portion of the adjoining element; and said elements are movable from a normally parallel, extended relationship to an angular, collapsed relationship to permit independent collapsing of either of the opposite edges of said cover plates with said belt as said conveyor belt moves through an arcuate path about an axis perpendicular to the plane of said belt.

References Cited

UNITED STATES PATENTS 2,222,025  11/1940  Fischer _____ 198—189
3,225,898  12/1965  Roinestad _____ 198—189 X

FOREIGN PATENTS 337,624  6/1921  Germany.

EVON C. BLUNK, *Primary Examiner.*

EDWARD A. SROKA, *Examiner.*